Jan. 1, 1952　　　　　R. BROUSSARD　　　　　2,580,400
PARKING METER AND COIN SLOT THEREFOR
Filed March 27, 1945　　　　　　　　　　6 Sheets-Sheet 1

INVENTOR.
ROBERT BROUSSARD
BY
HIS ATTORNEY

Jan. 1, 1952　　　　R. BROUSSARD　　　　2,580,400
PARKING METER AND COIN SLOT THEREFOR
Filed March 27, 1945　　　　　　　　　　　　6 Sheets-Sheet 2

*INVENTOR.*
ROBERT BROUSSARD
BY
HIS ATTORNEY

Jan. 1, 1952 R. BROUSSARD 2,580,400
PARKING METER AND COIN SLOT THEREFOR
Filed March 27, 1945 6 Sheets-Sheet 3

INVENTOR.
ROBERT BROUSSARD

Jan. 1, 1952  R. BROUSSARD  2,580,400
PARKING METER AND COIN SLOT THEREFOR
Filed March 27, 1945  6 Sheets-Sheet 4

INVENTOR.
ROBERT BROUSSARD
BY
HIS ATTORNEY

Jan. 1, 1952 R. BROUSSARD 2,580,400
PARKING METER AND COIN SLOT THEREFOR
Filed March 27, 1945 6 Sheets-Sheet 6

FIG-15

ROBERT BROUSSARD INVENTOR.

BY

HIS ATTORNEY

Patented Jan. 1, 1952

2,580,400

UNITED STATES PATENT OFFICE 2,580,400

PARKING METER AND COIN SLOT THEREFOR

Robert Broussard, Washington, D. C., assignor, by mesne assignments, to William P. Mac-Cracken, Jr., Washington, D. C., as trustee Application March 27, 1945, Serial No. 585,152

11 Claims. (Cl. 194—72)

My invention relates to parking meters, for use along streets, roadways and in conjunction with vehicle stalls and parking areas for example.

An object of my invention is the provision of a simple, practical and inexpensive parking meter of rugged construction having cam feed means, forming an integral and essential part of the same, which is adapted for setting timing mechanism of the apparatus to initiated position while feeding a coin.

Another object is to provide a device of the character indicated wherein driving energy for included set-initiated timing means is stored as an incident to the time-setting operation and in which energy imparted to coin feeding means of the meter is stored for driving the meter timing means.

Another object of my invention is the provision, in a device of the character indicated, of timing apparatus for selective setting to measure any one of several differing periods of time corresponding to different coin values payable to the meter.

A further object is to provide coin feed means in a parking meter, by which an inserted coin is automatically fed to effect the setting of associated timing mechanism only after external control over the feed means is relinquished; also the provision of a simple arrangement for encasing or housing the timing and coin feed mechanism; and coin receiver means for passing coins through the meter casing, which while either active or inactive, precludes tampering with the inner workings of the meter through the coin passage.

Another object of my invention is the provision in coin feed means of the character indicated of a coin receiver for passing genuine coins through the meter housing and for arresting spurious coins for return to the receiver outlet all while affording protection against external tampering.

A further object of the invention is to provide a device of the character indicated wherein the receipts that have accumulated incident to use are collected within the meter casing in a coin box characterized by certain advantageous features for emptying the same.

Other objects in part will be obvious and in part referred to hereinafter.

The invention accordingly consists in the combination of elements, features of construction and arrangement of parts as described herein and particularly set forth in the claims at the end of this specification.

In the accompanying drawings, in which like reference characters denote like parts throughout the several views, there is illustrated a parking meter embodying certain features of my invention.

Figures 1, 2:
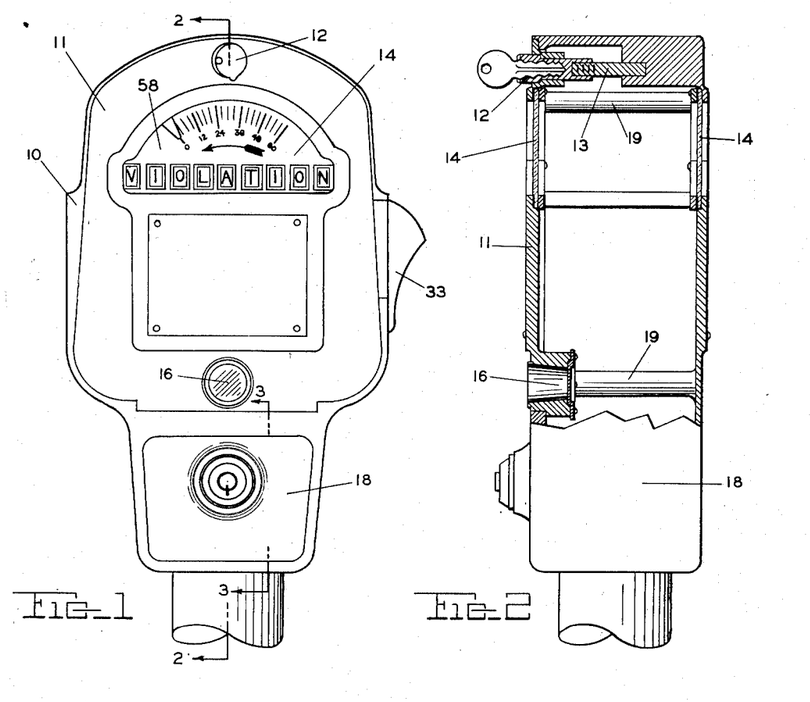
Figure 1 is a front elevation view of a preferred form of my parking meter.
Figure 2 is a partial sectional view in elevation along the line 2—2 of the meter housing with the meter operating mechanism removed.
Figure 12:
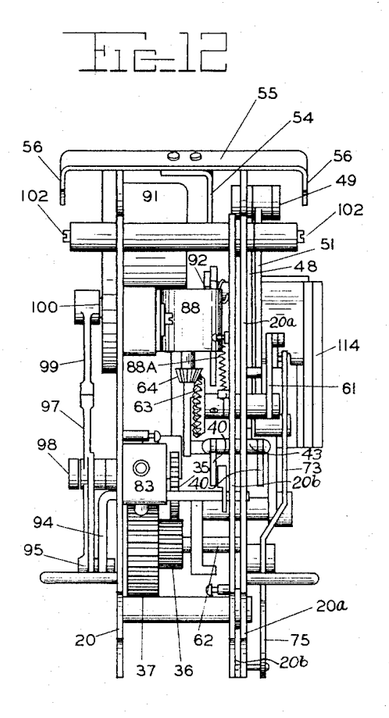
Figure 12 is a side elevation view corresponding to Figures 6, 7 and 8.

Referring now, more particularly, to the practice of my invention, attention is directed to the drawings, notably Figures 1 and 2. The meter will be seen to comprise an external housing 10 (Fig. 1) into which is seated a housing door 11. The door is held in place by a screw type lock 12 which engages with post 13 fixed into the housing as best illustrated in Figure 2. The upper part of the door is cut away to provide a glass window 14 for revealing a time indicator and signal plate which is to be discussed in detail later. A similar window for revealing a like time indicator and signal plate is provided in the back of the housing. In the housing door 11 there is a coin window 16 which displays, from inside, the last coin which has served to set the meter. A coin receiver 33 for manipulation in setting the meter extends through the right hand side of the housing (Fig. 1). The lower portion of the housing comprises a coin deposit chamber 18 for receiving coins after display of the same at window 16. The housing is sturdily reinforced with reinforcing ribs 19 and on inside walls is shaped to conform with the curvular edges of face plates 20, 20a and 20b (shown in Figs. 6, 8 and 12) so that the meter mechanism is firmly held in place in the housing without necessity for bolting and yet is easily removed.

Figure 3:
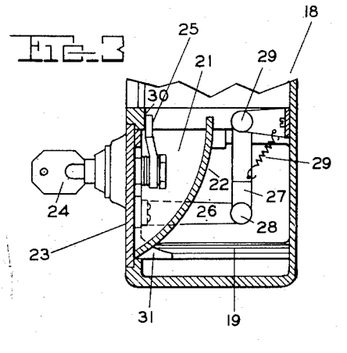
Figure 3 is a fragmentary sectional side elevation view of the meter coin deposit box along a line 3—3 of Figure 1, showing the coin box door closed.
Figure 4:
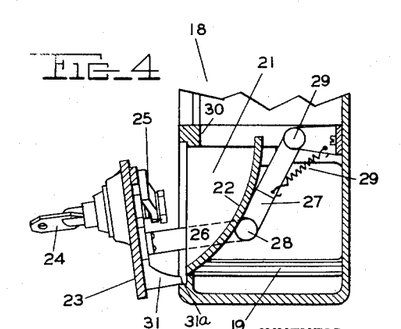
Figure 4 is a view similar to Figure 3 showing the coin box door open.

After the coins have enabled setting of the meter for a paid-for parking period, which operation will be discussed later, they are released into coin chamber 21 enclosed by coin retaining wall 22 and coin chamber door 23. Door 23 is firmly locked by key 24 and latch 25. Attached to door 23 are lever arms 26 and 27 which restrict outward movement of the door within limits of rotation about hinges 28 and 29. The lever arms 26 are held in position shown in Figure 3 by means of spring 29. When key 24 is turned in a clockwise direction, latch 25 is rotated clear of latchstop 30. Following this the operator can open the coin chamber door with one hand and with the other hand collect coins which are now free to slide (see Fig. 4) from coin retaining wall or bottom 22 and down between seating elements 31 located one onn each side of the bottom of the door for the purpose of seating the door in position when closed and for supporting the door (when the door is in open position) on ledge 31a of the meter housing. In wide open position, the door extends lever arms 27 and 28 on each side to their full run which prohibits complete removal of the door. By this hinged action, the door can be pulled free bodily with one hand without danger of dropping and when released slides back under action of spring 29 and guided by seating elements 31, to closed position.

Figure 5:
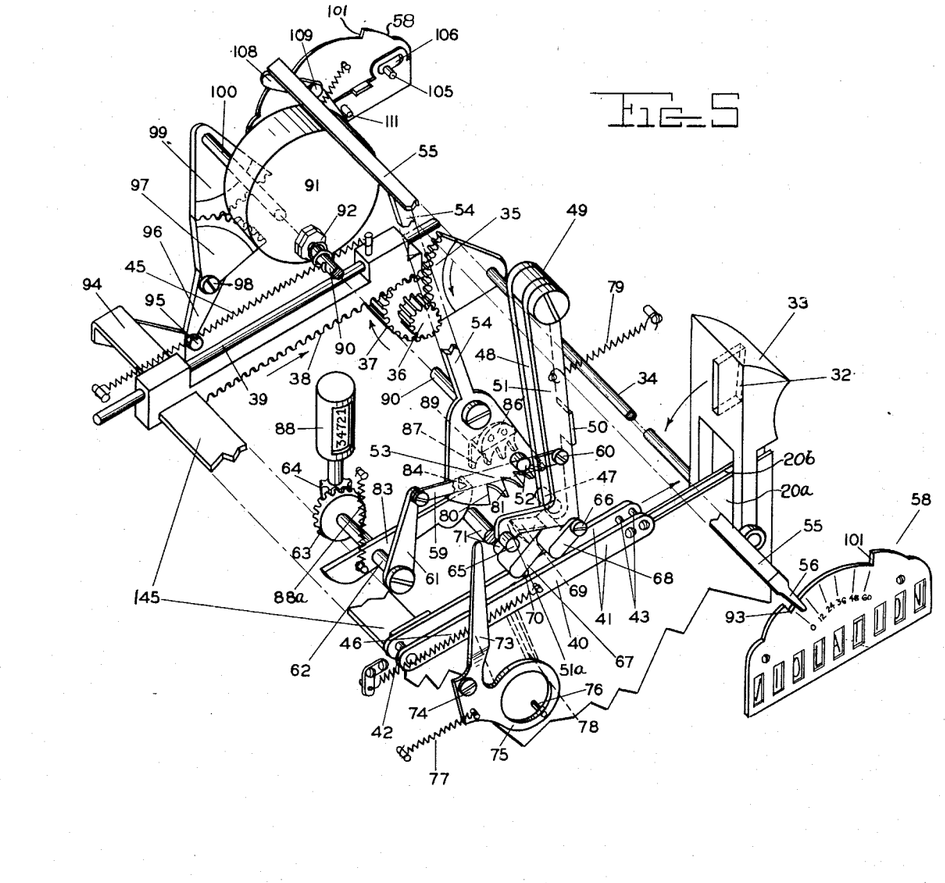
Figure 5 is a schematic isometric exploded view of meter operating mechanism in which the interaction of certain movable parts are illustrated.

In Figure 5, substantially all frame work, face plates, housings, and the like, of the meter have been omitted to facilitate a clearer understanding of certain features of my invention. The mechanism illustrated is adapted for receiving a coin, for example a nickel or a penny, which is inserted in outside end of slot 32 of coin receiver 33. The receiver then is pushed in (counterclockwise) for delivering and depositing the coin to a cooperating carrier or slide for feeding the coin in a manner more particularly discussed hereinafter. This motion of the receiver is transmitted along shaft 34 to sector gear 35 which in turn causes gear 36 and pinion 37 to rotate clockwise driving rack 38 to the right as indicated by arrow in Figure 5. The rack 38 is guided during movement by guide rod 39 whose position is fixed.

The coin carrier or slide 40, composed of two parallel plates 41 connected by lugs 42 and 43 and moving in slot 44 (Fig. 6) provided in parallel face plates 20a and 20b (Figs. 5 and 12), is rigidly attached to rack 38 by connecting plate 145. The plates 20a and 20b form the walls of a compartment for the actuating coin as appears more fully hereinafter. A bottom plate 20c between the plates 20a and 20b adjacent slot 44 (see Figs. 6, 13 and 14) forms a floor or track for supporting the coin during the carrying action. As the rack is driven to the right, so is the slide such that when coin receiver 33 has moved down through the entire path of its arc, the coin slide has moved in synchronism to its extreme right hand position. At this point the coin is discharged from the receiver (this will be described in detail later) and drops between plates 20a and 20b and onto bottom plate or track 20c to seat just in front of lugs 43.

Now that the coin is deposited, pressure is released on the coin receiver 33. Since the previously described action was accomplished under spring tension exerted by springs 45 and 46, when pressure on the coin receiver is released, the opposite motion automatically takes place; that is, provided the receiver 33 is relinquished, shaft 34 and sector gear 35 move clockwise, gear 36 and pinion 37 move counterclockwise thus driving back 38 and slide 40 to which it is connected, to the left. As the coin slide moves to the left, lugs 43 carry the coin forward with it.

Figure 13:
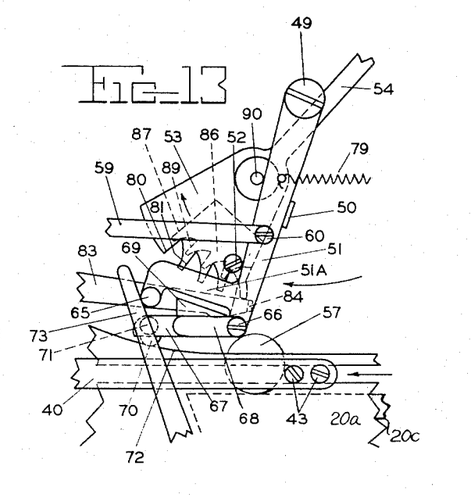
Figure 13 is a detailed elevation view of coin actuated time-set linkage in an advanced position resulting from the feed of a nickel.
Figure 14:
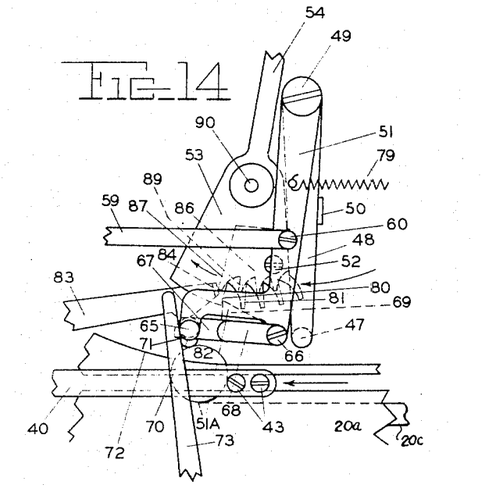
Figure 14 is a view similar to Figure 13 showing an advanced linkage position resulting from the feed of a penny.

While movement to the left continues the coin is carried to setting engagement with coin differentiating time-set linkage illustrated in Figures 13 and 14. In order to best describe the operation of this linkage the action of a nickel and penny on the same will be considered separately.

When a nickel 57 has been deposited and is being conveyed forward by the coin slide 40 it is brought into contact with post 47 (shown on Figs. 5 and 14 but concealed on Fig. 13) which is connected on the lower end of rear lever arm 48 which in turn rotates about shaft 49. As the nickel continues to be carried to the left, being in contact with post 47, it drives the rear lever arm 48 to the left (clockwise). Attached to the rear lever arm is flange 50 which contacts with front lever arm 51 bringing it forward also. As rear lever arm 48 moves forward it engages post 52 mounted on the lower right hand corner of finger plate 53 causing both rear lever arm and finger plate to rotate to the position shown in Figure 13. Attached to the finger plate by means of a connecting arm 54 is a time indicating arm 55 and indicating pointers 56. These are rotated clockwise also (to the right) through an arc equal to that described on the time indicator plate 58 between zero minutes and sixty minutes so that the indicators 56 come to rest at sixty minutes.

Simultaneously the forward motion of front lever arm 51 drives forward connecting arm 59 which is attached to the front lever arm by bolt 60. Connecting arm 59 in moving forward causes arm 61 and shaft 62 to rotate counterclockwise which in turn rotate bevel gears 63 and 64 to operate register 88 (illustrated in Fig. 5). Gears 63 and 64 are so constructed that the degree of rotation caused by the nickel on the coin actuated linkage described above is such as to cause the register to increase five units (signifying five cents).

Figure 6:
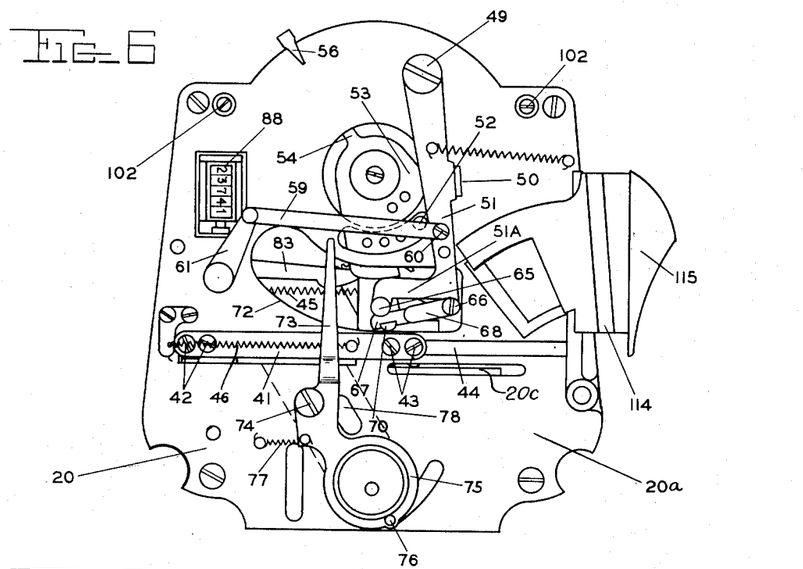
Figure 6 is a front elevation view of the meter mechanism.
Figure 7:
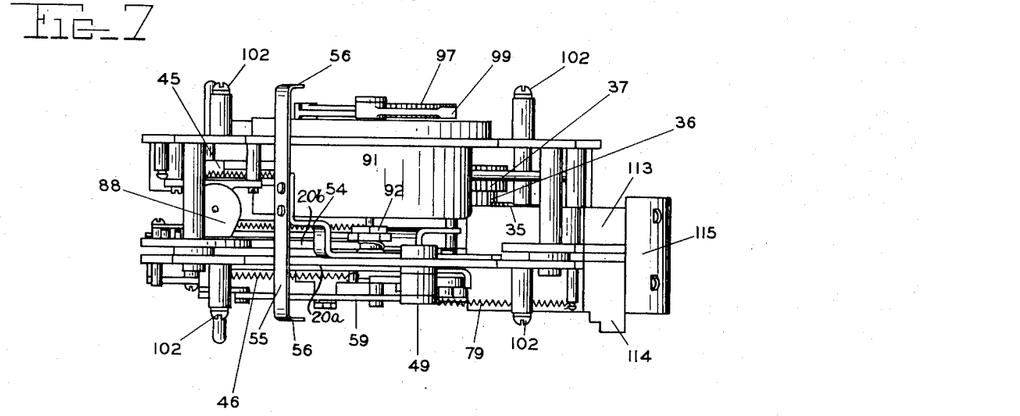
Figure 7 is a plan view corresponding to Figure 6.

While still considering the operations set in motion by a nickel, it might be well to describe the front lever arm 51 and its appendages in more detail. Unlike rear lever arm 48 which is substantially straight, the front lever arm 51 is crank-shaped. On the extreme lower left hand of the crank 51a is attached a coin release arm post 65, while on the extreme lower right hand corner is located a pivotal bolt 66 to which is connected a pawl assembly. This pawl assembly consists of an inner pawl 67, an outer pawl 68, a wedge shaped finger pawl 69, rider lug 70 and finger post 71. When the mechanism is operated by a nickel this pawl assembly has no functional use. It merely swings free riding along cam surface 72 fashioned in parallel face plates 20a and 20b as shown in Figures 6, 13 and 14. The purpose of these pawls will be described later when the action of a penny is shown. In the meantime coin release arm post 65 is brought forward into contact with coin detent release arm 73 causing it to rotate counterclockwise about pin 74. The previous coin deposited has been held behind coin release arm frame 75 by means of a detent or pin 76 mounted on the frame. The coin release arm frame is open at its center so that the coin being held can be viewed through window 16 shown in Figures 1 and 2. Now as coin release arm post 65 rotates coin release arm 73, pin 76 moves clear of the previously deposited coin allowing it to drop down into the coin deposit box 18, shown in Figures 1, 2, 3 and 4, after which it is drawn back into normal position by spring 77, as shown in Figure 5. By this time the nickel that actuated this linkage has been brought forward until slot or opening 78 is reached, at which point the coin drops by gravity through the slot and seats itself behind coin release arm frame 75 resting on pin 76 and remains there until another coin is deposited.

As can be seen, the above described movements have been motivated directly or indirectly by contact with the nickel which was carried forward by the coin slide 40. Now that the nickel has dropped clear of the coin slide through slot 78 the coin actuated linkage moves back under tension of spring 79 to original position, this with the exception of finger plate 53, connecting arm 54, indicating arm 55 and indicating pointers 56 which, of course, remain rotated in the clockwise position with the indicating pointer over the sixty-minute calibration. The subsequent action of this indicating mechanism will be explained in detail later.

In contrast to the action of a nickel on this mechanism, when a penny 82 (Fig. 14) is inserted in slot 32 of coin receiver 33 (Fig. 5) and is carried forward against lugs 43 of coin slide 40, because it has a smaller diameter than a nickel it does not come into contact with post 47 of rear lever arm, but instead passes beneath the same thus transmitting no motion to the rear lever arm 48 which incidentally has no function in this operation (i. e. with a penny). After passing under post 47 the penny is carried forward still further and passes under the pawl assembly, which is attached to and free to rotate about pivotal bolt 66, causing the entire pawl assembly to rotate upwards as the result of the penny pushing against the under surface of inner pawl. As the penny is carried still further forward it engages rider lug 70 attached to the under side of inner pawl 67. Up to this point substantially no motion has been transmitted to the front lever arm 51. The entire lug assembly, is rotated upward until the rider lug 70 has been lifted clear of the cam surface 72 (Fig. 14) and to a position where the wedge shaped finger pawl 69 is raised up to between the first finger 80 and second finger 81 of finger plate 53. Now as the penny continues to move forward, being engaged with rider lug 70 it carries with it the pawl assembly which in turn causes front lever arm 51 and its appendages to rotate to the left (clockwise). As the pawl assembly moves to the left the wedge shaped finger pawl 69 comes into contact with the first finger 80 of finger plate 53 thus rotating the finger plate in a clockwise direction. At the same time pawl post 71 which has been raised up with the pawl assembly and moved forward passes under the cam surface on the lower edge of limiting lever 83 causing it to rotate in a counterlockwise direction about shaft 62. The right hand end of the limiting lever 83 is flanged inwards and this flange 84 is raised by the cam action until it is in position to contact the first finger 87 of the limiting finger plate 86 riveted to and directly behind finger plate 53. Like finger plate 53, the limiting finger plate 86 is substantially triangular in shape into which sprocket type fingers have been cut along the bottom edge. It will be noted from the drawings that the fingers on finger plate 53 are cut so that their engaging surfaces are on the left while the fingers on limiting finger plate 86 are cut in the opposite way.

As the forward motion of the penny 82 is continued, wedge shaped finger pawl 69 continues to rotate finger plate 53 by means of engaging the first finger 80 of finger plate 53 until it has rotated through an angle equal to the angular distance between the first finger 80 and second finger 81. To fix this rotational movement exactly, the flange 84 on limiting lever 83 engages the first finger 87 of limiting finger plate 86. This restricts any further movement of finger plate 53 so that when angular movement is transmitted along connecting arm 54 to time indicating arm 55 and indicating pointers 56, the pointers are brought to rest exactly over the twelve-minute calibration of the time indicator plates 58. Identical to the operations explained above for a nickel, the coin release arm post 65 rotates the coin release arm 73 dropping the previously deposited coin into the coin deposit box 18.

It is important to note however that since no forward motion of the front lever arm 51 was accomplished until the penny had moved all the way forward to the rider lug 70 as contrasted to the nickel which actuated this mechanism after having travelled only the relatively short distance to the post 47 on the rear lever arm 48, the penny caused the front lever arm and its appendages to move only one-fifth the distance that the nickel did. As a result, connecting arm 59 is moved forward and arm 61, shaft 62 and gears 63 and 64 are rotated only one-fifth as far as they were when actuated by the nickel, and register 88 increases only one unit indicating the deposit of only one cent.

Just as the nickel, after the penny has moved over to slot 78 it drops down but, as distinguished from the nickel, because of its smaller diameter the penny is not held by pin 76 of coin release arm frame 75 but passes on into the coin receptacle 18. Additionally, where a previously inserted nickel is already present in frame 75 the penny is discharged around it. Movement of arm 51 with its coin release post 65 is substantially less with a penny than with a nickel and as a result the coin release arm 73, frame 75 and pin 76 are not moved to release the nickel. The rider lug 70 being no longer held in the forward position by the penny enables the entire coin actuated mechanism to move back to original position, the limiting lever being returned to position by spring 88a.

The foregoing thus describes how a nickel and a penny cause finger plate 53 to be rotated preferably as a part of the timing mechanism: the nickel by engaging post 47 rotates rear lever arm 48 which by coming in contact with the post 52 rotates finger plate 53 through its entire arc, setting indicator pointers 56 at sixty minutes; while the penny by virtue of its smaller diameter fails to contact post 47 and consequently moves forward an additional distance to rider lug 70 before actuating the linkage so that finger plate 53 rotates only one-fifth as far moving the indicator pointer only up to the twelve-minute calibration. If additional pennies are deposited up to five, the same operation is repeated as described above except in the instance of a second penny the wedge shaped finger pawl 69 engages second tooth 81 of finger plate 53 and the flange 84 on limiting lever 83 engages the second tooth 89 of limiting finger plate 86; the third penny causing the third teeth on each plate to be engaged, etc. All of the setting actions are achieved only after manual power has been expended and thus are free of any external forcing by the person depositing the coin.

It may be noted at this point that a penny is discharged from the carrier or slide 40 into slot 78 and falls in zig-zag path. Being smaller than a nickel it bounces against the walls of the coin slot as it drops, finally strikes the nickel in exposed view and then bounces forward into a slot provided for pennies, thereby shunting the nickel passageway to exposed view. The penny is not of sufficient diameter to cause actuation of the coin release mechanism as noted above. As a consequence, a previously inserted nickel is retained in exposed position and is not replaced by succeeding pennies. Moreover, there is no opportunity for the pennies to accumulate in the coin slot and jam the meter.

So now the finger plate 53 and indicator pointers 56 are positioned according to actual coin value deposited. This rotation has in turn been transmitted to shaft 90 which is connected between finger plate 53 and clock mechanism 91 through a suitable slip clutch 92 which permits the finger plate 53 to be rotated clockwise in opposition to normal movement of the clock. Once the clock is set, however, the clutch friction is sufficient for the clock to drive finger plate 53 and the indicator pointers 56 attached thereto back through a counterclockwise rotation to the zero setting at a velocity required to traverse the distance back to the zero setting in the time indicated. In the event that the clock mechanism 91 is still operating when the indicator pointers have returned to zero and is there restricted to any further movement by shoulders 93 on time indicator plates 58, the clock mechanism is permitted to continue operating until it has run down by the slip clutch 92.

Figure 8:
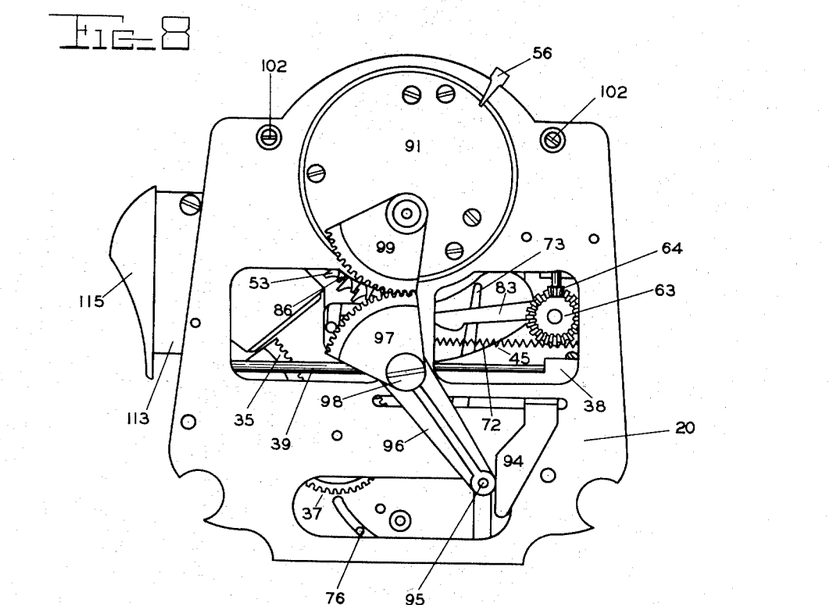
Figure 8 is a rear elevation view of the mechanism illustrated in Figures 6 and 7.

The clock mechanism 91 is provided with driving energy automatically as in the following manner: Attached to the left hand end of rack 38 and projecting to the rear is a lever 94. This lever is shaped substantially as shown in Figures 5 and 8 and is engaged with post 95 on arm 96 which is connected with sector gear 97. Arm 96 and gear 97 are free to rotate about pin 98. Meshed with gear 97 is another sector gear 99 which delivers winding torque to a suitable clock spring (not shown) of the meter timing mechanism as by means of shaft 100. The winding operation is accomplished as follows: As a coin is fed through the receiver 33 on the in stroke, shaft 34 is rotated by the forward motion, sector gear 35, gear 36, and pinion 37 driving rack 38 to the right as described previously. This motion also carries lever 94 to the right thereby rotating post 95, arm 96 and sector gear 97 in a counterclockwise direction about pin 98. Being meshed with sector gear 99, the latter and shaft 100 are driven clockwise through an angle sufficient to wind or store energy in the clock spring enough for driving the timing mechanism in excess of one hour. As the spring runs down driving the paid-for timing operation, sector gears 97 and 99 and their appendages rotate back to their initial positions. Although other arrangements in accordance with the invention are contemplated, it will be noted, in connection with the present embodiment, that the clock mechanism is wound the same amount whether a nickel or a penny is deposited.

Figure 9:
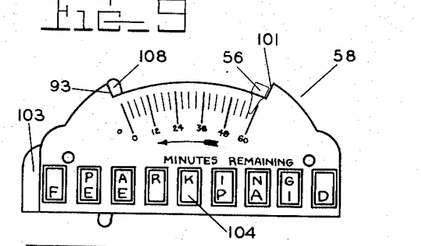
Figure 9 is a detail view of the front of the meter time indicator and signal plate in position representative of an unexpired parking period.
Figure 10:
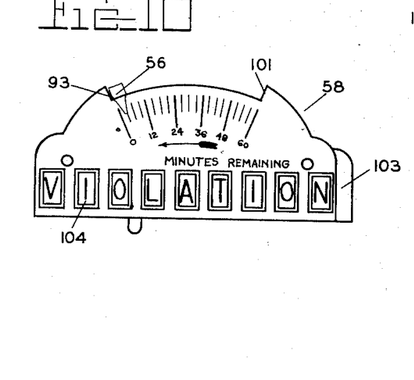
Figure 10 is a view similar to Figure 9 but showing the plate in expired parking time position.
Figure 11:
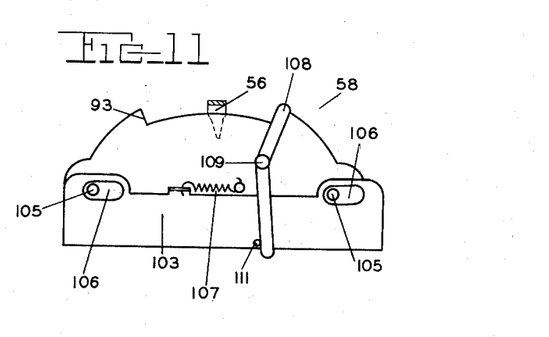
Figure 11 is a detailed rear view of the time indicator plate.

To explain the details and operation of a time indicator plate 58 and its mechanism, attention is directed to Figures 9, 10 and 11. The time indicator plate is shaped as indicated in Figure 9 and is provided with a row of nine rectangular slots separated by a space equal to the width of the slots. The top edge of the time indicator plate is curved, the curve extending to shoulders 93 and 101, one on each side, whose function is to limit the sweep of the indicator pointer 56. The upper face of the time indicator plate 58 is calibrated from one to sixty minutes to show the number of minutes of parking time remaining. The time indicator plate 58 is affixed to the mechanism by being screwed to posts 102 as shown in Figures 5, 6, 7 and 12. Mounted behind the open slots 104 of time indicator plate 58 is signal plate 103 which is held in position by posts 105 (Fig. 11) which protrude through slots 106 and whose purpose it is to guide the lateral movement of the signal plate 103 and limit its travel as well as to register the position of the signal plate with respect to the open slots 104. The front face of signal plate 103 is printed with "Parking fee paid" and "Violation," the letters of which are spaced alternately so that when the signal plate is shifted to the left to the limit of its movement as permitted by slots 106 the phrase "Parking fee paid" is displayed through rectangular slots 104 in time indicator plate 58. This position is illustrated in Figure 9. When the signal plate is moved to its extreme right hand position as shown in Figure 10 the word "Violation" appears through slots 104.

After a coin has been deposited and an indicator pointer 56 has moved to some position such as shown in Figure 11, the signal plate 103 moves to the right (note that these directions will be opposite from those described in Figures 9 and 10 as Figure 11 is a rear view) by spring tension from spring 107. In this position "Parking free paid" is displayed as illustrated in Figure 9. After the time paid for elapses and the clock mechanism has returned the time indicator pointer 56 to zero position, the pointer contacts upper lever arm 108 which rotates about pin 109 as does lower lever arm 110 which is connected to the upper lever arm 108. This rotation causes the lower lever arm to move clockwise as seen in Fig. 11 and engage post 111 which is fixed onto signal plate 103. As post 111, and likewise signal plate 103 are moved to the left against tension of spring 107, the word "Violation" appears in the rectangular slots 104 in time indicator plate 58 (see Fig. 10). The signal plate remains in this position until another coin is deposited, at which time indicator pointer again moves to the left and the above described operation is repeated.

The coin receiver 33 referred to hereinbefore, in a preferred form (as illustrated in exploded view in Fig. 15), is movable between fixed side housing members 113 and 114 and through fixed front housing member 115 which in the drawing have been exploded out for better revealing certain parts of the receiver. It will be understood that the housing members just mentioned form a part of the meter housing 10. The receiver proper includes a casing made up of chambered portion 33a having an open side and casing plate 33b for covering the open side. The casing is mounted on connecting arms 116 and 117 which are attached to shaft 34 for rocking motion with the shaft as an axis. By this arrangement the receiver casing is free to reciprocate through the meter housing, that is, through front housing member 115.

Figure 15:
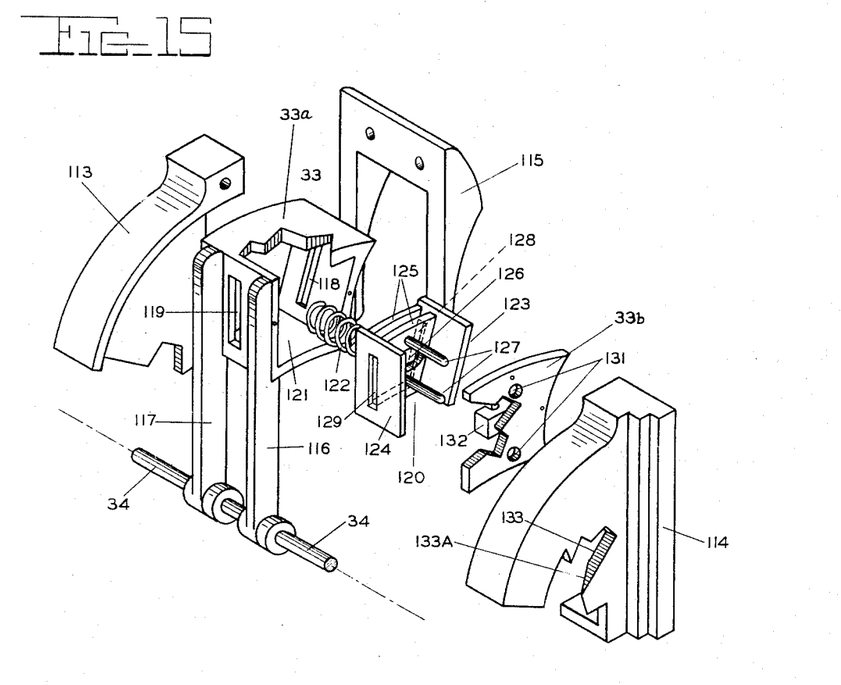
Figure 15 is an exploded isometric view of a preferred coin receiver and its mechanism.

Coin entrance slot 118 and coin exit slot 119 located in opposite faces of the coin receiver casing are obliquely situated with respect to each other, such as illustrated in Figure 15. A coin passage assembly 120 fits into interior chamber 121 of the receiver casing against coil spring 122. The coin passage assembly 120 consists of a front face plate 123, back face plate 124, two separated coin passage plates 125 one of which has a slotted opening 126, upper and lower follower posts 127, a slot 128 in the front face plate and a slot 129 in the back face plate. Between the plates 125 and preferably in the same plane with the bottoms of slots 128 and 129, is a coin passage bottom enabling free feed of a coin in either direction through the passage assembly. Slots 128 and 129, although on the oblique with respect to each other, are positioned on the vertical to enable sequential alignment thereof with the space between the coin passage plates 125.

The casing plate 33b encloses the coin passage assembly in chamber 121, and has upper and lower holes 131 therein in such position as to permit entry of the follower posts 127. The plate is shown cut away to reveal a permanent magnet 132 attached thereto on the inside face in such position that when the coin receiver is assembled the magnet protrudes through slotted opening 126; the plate being securely mounted, as by means of screws, to close off the open side of chambered portion 33a of the casing.

Considering now that these parts are assembled as explained above, the operation is as follows: When a coin (either a penny or a nickel) is inserted in coin entrance slot 118 of coin receiver 33, it passes through slot 128 in the front face plate of coin passage assembly 120 and then into the slot between coin passage plates 125. These are maintained directly in line in the following manner: The follower posts 127 which are attached to the coin passage assembly 120 and protrude through holes 131 in casing plate 33b are riding against the inside wall of the housing member 114. This wall is machined to provide a cam surface 133 (the housing member is cut away in Fig. 15 to illustrate this). When the coin is first inserted, the follower posts 127 are riding against an upper section of the cam surface 133 which projects inwards so that the coin passage assembly is forced well back into interior chamber 121 of coin receiver 33, in which position coin entrance slot 118 and the slot between coin passage plates 125 are lined up (note however that at this point the coin exit slot 119 is not lined up with the slot between the coin passage plates 125 so that the coin cannot pass out of the exit end of the coin receiver 33). With the coin lodged in the slots between the coin passage plates 125, the person depositing the coin pushes receiver 33 forward rotating it about shaft 34. As it moves forward the follower posts 127 being guided down cam surface 133 begin to move outwards forced by spring 122 as the follower posts 127 enter the bevelled portion of the cam surface 133a. When the follower posts have reached the end of the bevelled portion of the cam surface which occurs at least before completion of the in stroke of the receiver reciprocating movement, the coin passage assembly has shifted so that the slot 129 in the back face plate of the coin passage assembly is now lined up with the coin exit slot 119. The coin is now free to drop out of the coin receiver by gravity onto the coin slide 40. The movement of the coin passage assembly, therefore, is so designed that when the coin is first deposited it will not pass through the receiver and is held in the coin passage assembly until the coin receiver has been pushed all the way in. Once the receiver is pushed in no tampering can be brought to bear upon the coin for alignment no longer exists with the inlet opening.

In the event that a slug is deposited, the slug is rejected preferably in the following manner: As the slug enters the coin entrance slot and then into the slot between the coin passage plates 125 the permanent magnet 132 on the rear face of the coin receiver plate 130 is held away from the slug because the coin passage assembly 120 is held back away from it by follower posts 127 being depressed by cam surface 133. As the coin receiver 33 rotates forward in chamber 33a, however, coin passage assembly 120 moves forward so that now the slug is directly adjacent to magnet 132. Since slugs, as distinguished from genuine coins, are generally of a ferrous base alloy and are therefore magnetic, the magnet 132 grasps the slug and now that the slot 129 in the back face plate of the coin passage assembly 120 is in line with the coin exit slot 119, instead of passing through into the mechanism the slug is held firmly against the magnet to initiate return of the same to the inlet opening. As the coin receiver retracts in a clockwise direction when pressure against it is released, the coin passage mechanism is again depressed by action against cam surface 133 so that the slug carried in the slot between the coin passage plates 125 is moved back and away from the magnet. After the coin receiver 33 returns with shaft 34 to normal position, at which slot 128 in front face plate 123 once more is aligned with coin entrance slot 118, the slug is discharged from the coin receiver 33 through the latter slot. The gravity discharge of slugs through slot 118 and of genuine coins through slot 119 conveniently is achieved by construction of the meter to ensure that the coin passage floor between plates 125 is carried to neutral gravity feeding position somewhere intermediate normal and fully depressed positions of the tiltable receiver, yet is tilted toward slot 118 in normal position of the receiver and toward slot 119 when the receiver is in fully depressed position. When nickels or pennies are deposited, being non-ferrous, they are not held by magnet 132 on the feed stroke and thus are allowed to pass through coin exit slot 119 into the coin slide to set the meter timing mechanism.

As many possible embodiments may be made of my invention and as many changes may be made in the embodiment hereinbefore set forth, it is to be understood that all matter described herein, or shown in the accompanying drawings, is to be interpreted as illustrative and not as a limitation.

I claim:

1. A parking meter comprising means for indicating the passage of time; a source of power for driving said time indicating means and including spring means for storing potential driving energy; coin receiver means horizontally mounted for forward and return rocking in a vertical plane and having a vertical slot therein for receiving a coin edgewise and, as an incident to bringing the coin edgewise in said vertical plane to a point of discharge in forwardly rocking the receiver, delivering energy to said energy storing means; carrier means operably connected with said coin receiver means and having a coin conveyor portion movable along a prescribed path in a vertical plane for accepting a coin as discharged from the receiver in its forward coin delivery position and conveying the coin in vertical position along such prescribed path to setting relation with said time indicating means and to a point of emission; means receiving the emitted coin; detent means in said last-mentioned means and normally in position for arresting the emitted coin for visible display and disposed for tripping by said carrier upon resetting the time indicating means; signalling means adapted for actuation to visible position with said time indicating means to indicate expiration of the time paid for; and coin chamber means for collecting coins released by the detent means as an incident to resetting the time indicating means.

2. A parking meter comprising time indicating means; means for setting the same to a predetermined timing position; a source of power for driving said time indicating means and including spring means for storing potential driving energy; slotted coin receiver means horizontally mounted for forward and return movement in a vertical plane for delivering energy to said storing means as an incident to manually pressing the receiver in accepting a coin and pushing the same forward to a point of discharge; carrier means having a conveyor portion mounted for back and forth movement in the vertical plane of said coin receiver and movable from a point of alignment with the point of discharge of the receiver, in the forward position of the same for accepting the discharged coin, to a point of discharge, and in so doing actuating said setting means; and detector means actuated by the receiver for contacting and restraining a spurious coin from being fed from the receiver outlet opening in the forward position of the receiver and releasing the same and permitting discharge back through the inlet opening upon the return position of the receiver being reached.

3. In a parking meter, in combination with associated mechanism adapted to be set with a coin to initiate functioning thereof; a coin receiver horizontally mounted for forward and return oscillating movement in a vertical plane above the axis of mounting and having a vertical slot for accepting a coin edgewise in one position of the receiver and, upon being manually pushed forward, delivering the coin to a point of discharge through a vertical outlet therein; and coin carrier means operably connected with said receiver and including a conveyor portion mounted for forth-and-back movement in a vertical plane and having a vertical slot therein in the plane of the vertical outlet in the receiver for accepting the coin edgewise in one extreme position of the conveyor portion upon discharge from the receiver in its forward position and, conveying the coin along a prescribed path to a point of discharge.

4. In combination with associated mechanism adapted to be set with a coin to initiate functioning thereof; a coin receiver mounted for forward and return reciprocating movement and having separately disposed inlet and outlet openings therein spaced obliquely one from the other; coin passage means forming part of said receiver means; means for shifting the position of coin passage means by movement of said receiver means from alignment with said inlet to alignment with said outlet, for enabling the feed of a coin therefrom to either one of said coin receiver openings as determined by the forward and return reciprocating movement; a spring-biased coin carrier associated with said receiver and mounted for back-and-forth movement in a vertical plane controlled by the receiver for accepting a genuine coin from the outlet opening of the receiver in the forward position of the receiver and conveying the same edgewise in said vertical plane to setting relation with said associated mechanism; and detector means actuated by the receiver for contacting and restraining a spurious coin from being fed from the receiver outlet opening in the forward position of the receiver and releasing the same and permitting discharge back through the inlet opening upon the return position of the receiver being reached.

5. In combination with associated time indicator apparatus adapted to be set by a coin to initiate functioning thereof; a coin receiver horizontally mounted for forward and return movement in a vertical plane and having a vertical slot for accepting a coin edgewise in one position of the receiver and, upon being manually pushed forward, delivering the coin to a point of discharge through a vertical outlet therein; coin carrier means operably connected with said receiver and including a conveyor portion mounted for forth-and-back movement in a vertical plane and having a vertical slot therein in the plane of the vertical outlet in the receiver for accepting the coin edgewise in one extreme position of the conveyor portion upon discharge from the receiver in its forward position and, conveying the coin along a prescribed path to a point of discharge; and coin differentiating means including displaceable means adjacent said conveyor portion and in position for edge contact with the coin as it is conveyed along the prescribed path by said conveyor portion to displace the displaceable means and achieve a setting of said timing apparatus by contact of the displaced differentiating means consistent with the diameter of the particular coin as gauged by said displaceable means.

6. In apparatus of the class described, coin feed means including conveyor means for transporting a coin edgewise along a predetermined path; displaceable time indicator setting means along said path operable by a nickel; other displaceable time setting means further along said path operable by a penny, said conveyor means delivering the coin to edge contact and driving relation with said first time setting means where the coin is a nickel, but where the coin is a penny, then on to edge contact and driving relation with said second time setting means in carrying the coin to a point of emission; and means for receiving the emitted coin including detent means normally in position for arresting the emitted nickel for visible display, said first time setting means including means actuating said second time setting means to trip said detent means upon operation thereof.

7. In combination, time indicating means, clock means for driving the same, coin receiving mechanism including a vertical slotted coin receiver mounted for back and forth movement in a vertical plane and a coin carrier operably connected with said receiver and moveable in said vertical plane and having a vertical passage for accepting a coin from said receiver, means operated by said coin receiving mechanism to wind said clock means, and means operated by a coin in said carrier to set said indicating means.

8. In combination, time indicating means, clock means for driving the same, coin receiving mechanism including a receiver mounted for back and forth movement in a vertical plane and a coin carrier also mounted for back and forth movement in said vertical plane and operably connected with said coin receiver, means operated by said coin receiving mechanism to wind said clock means, and coin selector means adapted to be operated by a coin in said carrier to set said indicating means for timing a period corresponding to the denominational value of said coin.

9. In combination, time indicating means comprising a scale, clock means for driving the time indicating means, coin handling means including a receiver mounted for movement in a plane and a coin carrier mounted for movement in the same plane for accepting a coin from the receiver, means operated by said coin handling means to wind said clock means, selecting means operable by a nickel in said handling means to set said time indicating means to full-scale operation, and selecting means operable by a penny in said coin handling means to set said time indicating means to ⅕-scale operation.

10. In combination, time indicating means having an indicator and a controlling plate, clock means for driving said indicator, coin receiver means mounted for movement in a plane, coin carrier means operably connected with said receiver means and mounted for movement in the plane of said coin receiver and into which a coin is passed from said receiver means, means operated by one of said receiver means and carrier means to wind said clock means, means operated by a nickel in said coin receiver means to engage said controlling plate and set said indicator to full indicating position, and means operated by a penny in said coin receiver means to set said indicator to ⅕ of full indicating position.

11. In combination, time indicating means, signal means associated with said indicating means, clock means for driving said time indicating means, coin receiving means mounted for movement in a plane, coin carrier means operably connected with said coin receiving means and mounted for movement in the same plane, means operated by one of said coin receiver means and carrier means to wind said clock means, and coin selector means operated by a coin in said carrier means to set said indicating means to a position depending upon the denomination of the actuating coin, said signal means having actuating elements released by said indicating means to show one signal position in setting said indicating means and engaged by said indicating means upon return of the same to show another signal position.

ROBERT BROUSSARD.

REFERENCES CITED

The following references are of record in the file of this patent:

UNITED STATES PATENTS

| Number | Name | Date |
|---|---|---|
| 1,087,116 | Green | Feb. 17, 1914 |
| 1,216,357 | Pratt | Feb. 20, 1917 |
| 1,869,616 | Radtke | Aug. 21, 1932 |
| 1,991,250 | Shinn | Feb. 12, 1935 |
| 1,996,338 | Kenyon et al. | Apr. 2, 1935 |
| 2,109,864 | Long | Mar. 1, 1938 |
| 2,118,318 | Magee | May 24, 1938 |
| 2,213,240 | Clausen | Sept. 3, 1940 |
| 2,308,836 | Sisk et al. | Jan. 19, 1943 |
| 2,310,900 | Mayer | Feb. 9, 1943 |
| 2,371,114 | Von Stroeser | Mar. 6, 1945 |

FOREIGN PATENTS

| Number | Country | Date |
|---|---|---|
| 291,151 | Germany | Apr. 5, 1916 |